(12) United States Patent
Jägenstedt

(10) Patent No.: US 9,119,341 B2
(45) Date of Patent: Sep. 1, 2015

(54) ROBOTIC GARDEN TOOL FOLLOWING WIRES AT A DISTANCE USING MULTIPLE SIGNALS

(75) Inventor: Patrik Jägenstedt, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 248 days.

(21) Appl. No.: 13/639,302

(22) PCT Filed: Apr. 14, 2010

(86) PCT No.: PCT/SE2010/050399
§ 371 (c)(1),
(2), (4) Date: Oct. 4, 2012

(87) PCT Pub. No.: WO2011/129728
PCT Pub. Date: Oct. 20, 2011

(65) Prior Publication Data
US 2013/0030609 A1   Jan. 31, 2013

(51) Int. Cl.
*G05D 1/00* (2006.01)
*B62D 1/00* (2006.01)
(Continued)

(52) U.S. Cl.
CPC ............ *A01D 34/008* (2013.01); *G05D 1/0265* (2013.01); *G05D 2201/0208* (2013.01)

(58) Field of Classification Search
CPC . G05D 1/0225; G05D 1/0259; G05D 1/0263; G05D 1/0265
USPC .................. 901/1, 46, 50; 700/245, 253, 258; 318/568.12, 568.16, 568.22; 701/2, 23, 701/25, 26; 180/67
See application file for complete search history.

(56) References Cited

U.S. PATENT DOCUMENTS 4,918,362 A * 4/1990 Christensen et al. ......... 318/587
6,465,982 B1 10/2002 Bergvall et al.
(Continued)

FOREIGN PATENT DOCUMENTS

EP   1933467 A2   6/2008
WO   9938056 A1   7/1999
(Continued)

OTHER PUBLICATIONS

International Search Report and Written Opinion of PCT/SE2010/050399 mailed Dec. 22, 2010.
(Continued)

*Primary Examiner* — Fadey Jabr
*Assistant Examiner* — Aaron L Troost
(74) *Attorney, Agent, or Firm* — Nelson Mullins Riley & Scarborough LLP

(57) ABSTRACT

The present invention relates to a method (300) and a system (100) for guiding a robotic garden tool to a predetermined position. The robotic garden tool includes a control unit (104) and a sensor unit (102) to detect signals. The sensor unit (102) detects a first signal (110) from a first signal source (106) and the robotic garden tool follows the first signal (110) at a varying distance from the first signal source (106) that is less than or equal to a maximum distance to the first signal source, towards the predetermined position. Wherein, the varying distance is a function of the strength of the detected first signal (110). While detecting the first signal (110), the sensor unit may also detect a second signal (112) from a second signal source (108). The robotic garden tool follows the first signal (110) at a varying distance that is less than or equal to the maximum distance to the first signal source, wherein the maximum distance, at least in part, is now set based on the strength of the detected second signal (112), to reach a predetermined position.

18 Claims, 3 Drawing Sheets

(51) Int. Cl.
    *A01D 34/00*   (2006.01)
    *G05D 1/02*    (2006.01)

(56) References Cited

U.S. PATENT DOCUMENTS 7,155,309 B2 * 12/2006 Peless et al. .............. 700/245
7,668,631 B2 *  2/2010 Bernini ...................... 701/23
2007/0179690 A1 *  8/2007 Stewart ..................... 701/23

FOREIGN PATENT DOCUMENTS

WO     03104909  A1   12/2003
WO     03104908  A1   12/2009

OTHER PUBLICATIONS

Chapter I International Preliminary Report on Patentability of PCT/SE2010/050399 mailed Oct. 16, 2012.

* cited by examiner

ROBOTIC GARDEN TOOL FOLLOWING WIRES AT A DISTANCE USING MULTIPLE SIGNALS

TECHNICAL FIELD

The present invention relates to a robotic garden tool. In particular, the present invention relates to methods and systems for guiding a robotic garden tool to or from a charging station.

BACKGROUND

The robotic garden tools, for example, but not limited to, robotic lawnmowers are widely used for grass cutting applications in a lawn. Typically, a robotic lawnmower is an autonomous robotic tool and uses a battery as the power source. Based on the operating load and duration, there is a need to recharge the battery of the robotic lawnmower periodically. As an autonomous robotic lawnmower work unattended, it is required to find a path to a charging station in case the battery power level falls below a threshold power level during operation.

There are many techniques currently used to find a path to the charging station. A simple way of doing that is, by mounting an antenna on the charging station, so whenever the robotic lawnmower needs to charge its battery it will sense the antenna signal to track back to the charging station. But, the problem with such a system is the limited range of antenna; there is a possibility that the robotic lawnmower may not be able to detect the antenna signal before the battery runs out. This problem is more pronounced in case of large areas to be mowed. Another disadvantage of such a system is the increased complexity and cost of mounting an antenna on the charging station in the vicinity of a charging plate.

For overcoming the above mentioned disadvantage, one or more wires may be laid on the mowing surface. These wires may guide the robotic lawnmower to the charging station. This effectively eliminates the problem of increased time for searching for a charging station; but the problem of permanent tracks on the grass surface may occur. This happens because the robotic lawnmower will take the same path each time it needs to charge its battery.

A solution to the above problem may be following the boundary at larger distance; this eliminates the problem of permanent tracks. But this system too has disadvantage that robotic lawnmower may take a long time to reach the station if it starts from a bad spot. Also, if there are multiple areas to be cut, the linking passage may be small and the technique of following wire at large distances will be ineffective.

Further, in order to enable the lawnmower to pass through a narrow passage, and still follow the boundary at a large distance as possible, the system needs to be tuned and tested carefully in order to make it work as intended. The large distance is limited by the dimension of the narrow passage. Thereby, the installation process of such system is complicated and time-consuming.

Perhaps, an effective way to eliminate the drawbacks associated with the wire system is by using a navigation system, like GPS, for guiding the robotic lawnmower around the mowing area. This type of system is more accurate and also provides flexibility in controlling the overall operation with relative ease. But, the system needs complex circuits and interfaces, which increase the overall complexity and cost of the system.

In light of the foregoing, there is a need for an improved method and system to find a path to a charging station, which will overcome the disadvantages of complex integration, increased cost and permanent tracks on the grass surface.

SUMMARY

In view of the above, it is an objective to solve or at least reduce the problems discussed above. In particular, an objective is to provide methods and system to find a path to or from a charging station to avoid permanent tracks on the grass surface as well as keeping the related circuitry simple and cost effective.

The objective is achieved by a novel method for guiding a robotic garden tool to a predetermined position as described below. The robotic garden tool may include at least one sensing means. The method may include a step of detecting a first signal from a first signal source by the sensor means. Further, the method may include following the first signal at a varying distance from the first signal source. Wherein the varying distance may be a distance that is less than or equal to a maximum distance from the first signal source. The movement of the robotic garden tool at the varying distance from the first signal source may help to avoid any permanent tracks on the grass. The method may further comprise the step of detecting a second signal from a second signal source. Finally, when the robotic garden tool detects the second signal, the method may include a step of following the first signal source at a varying distance from the first signal source that is less than or equal to the maximum distance from the first signal source, and wherein the maximum distance may be at least in parts set based on the detected second signal, to reach the predetermined position. Thereby, the robotic garden tool may follow the first signal source at a varying distance also through narrow passages. When there is large space around the first signal source, the maximum distance is set to be large, and thereby providing a large distance between the first signal source and the maximum distance wherein the robotic garden tool may vary its distance to the first signal source. Wheel tracks in the lawn may thereby be effectively avoided. At narrow passages in the working area, the maximum distance is decreased in order to enable the robotic garden tool to find its way through the passage when following the first signal source. Thereby, the distance between the robotic garden tool and the first signal source may be varied as much as possible also at narrow passages, and thereby in a larger sense avoiding wheel tracks. There is no need of setting the maximum distance at larger areas of the working area based on the area shape at a narrow passage. This also provides an easier installation of the robotic garden tool in a working area.

According to an example embodiment of the robotic garden tool, the at least one sensing means may further comprise a first and second sensing means, these sensing means may be adapted to detect the first signal and second signal, respectively.

According to claims some example embodiments of the robotic garden tool, the first signal source may be a guide wire and the second signal source may be a boundary wire. The boundary wire may be adapted to, at least partly, define a working area in which the robotic garden tool operates. The guide wire may be adapted to be provided within the working area of the garden tool in order to guide the garden tool to the predetermined position. There may be more than one guide wire within the same working area.

According to some example embodiments of the robotic garden tool, the robotic garden tool may follow the first signal at a varying distance from the first signal source based at least in parts on the detected strength of the first signal from the first signal source. The varying distance may be randomly selected for each operating cycle when the robotic garden tool starts to follow the first signal source. The following of the first signal source by the robotic garden tool may be controlled based on the detected strength of the first signal and the randomly selected distance.

According to an example embodiment of the robotic tool, the robotic garden tool may follow the first signal at a varying distance from the first signal source, wherein the varying distance may be less than or equal to the maximum distance from the first signal source. The maximum distance here may be based at least in part on the detected strength of the second signal. Further, for a greater strength of the second signal, the maximum distance may get reduced. Thereby, when the robotic garden tool follows the first signal source and detects also the second signal from the second signal source, the detected strength of the second signal affects the maximum distance such that the maximum distance is reduced. This may provide the possibility of following the first signal source at a large distance when not detecting the second signal, and when detecting the second signal, i.e. at a narrow passage, the maximum distance from the first signal source may be reduced such that the robotic garden tool may not get stuck or find its way through the passage.

According to an example embodiment of the robotic garden tool, the first and the second signals may be magnetic field signals.

According to some example embodiments of the robotic garden tool, the predetermined position may be a position of the charging station.

In one embodiment, according to an example embodiment of the robotic garden tool, the robotic garden tool may be a robotic lawn mower.

In another example embodiment a system is provided for implementing the above mentioned method, the system comprising a first signal source providing a first signal, a second signal source providing a second signal and a robotic garden tool comprising at least one sensing means adapted to detect the first and the second signal. According to the system, the robotic garden tool may be adapted to follow the first signal at a varying distance from the first signal source towards a predetermined position. Wherein the varying distance may be less than or equal to a maximum distance from the first signal source, which maximum distance may in turn be set at least in part based on the detection of the second signal from a second signal source.

The system may include a control unit and at least one sensor unit. The control unit may be embodied in the robotic garden tool for guiding the robotic garden tool to the predetermined position. Further, the sensor unit may be adapted to detect the first signal and the second signal from a first signal source and a second signal source respectively. Thereby, the robotic garden tool may be adapted to follow the first signal source and may be able to navigate through narrow passages, and still move at a as large possible distance to the first signal source as possible, since the second signal from the second signal source also may be detected which affects the following of the first signal source.

According to an example embodiment of the robotic garden tool, the system may include one sensing means, which may further comprise of a first and a second sensing means to detect the first signal and the second signal, respectively.

According to some example embodiments of the robotic garden tool, the first signal source may be a guide wire and the second signal source may be a boundary wire.

According to some example embodiments of the robotic garden tool, the system may be adapted to follow the first signal at a varying distance from the first signal source. Wherein the varying distance may be dependent at least in part on the detected strength of the first signal.

According to an example embodiment of the robotic garden tool, the robotic garden tool may follow the first signal source at a varying distance, the varying distance may be less than or equal to the maximum distance from the first signal source. Further, the maximum distance may be set at least in part based on the detected strength of the second signal. Wherein, for the greater strength of the detected second signal, the maximum distance may be reduced.

According to an example embodiment of the robotic garden tool, the first signal and the second signal may be magnetic signals.

According to some example embodiments of the robotic garden tool, the predetermined position may be the position of the charging station.

BRIEF DESCRIPTION OF THE DRAWINGS

The invention will in the following be described in more detail with reference to the enclosed drawings, wherein.

DESCRIPTION OF EMBODIMENTS

Figure 1:
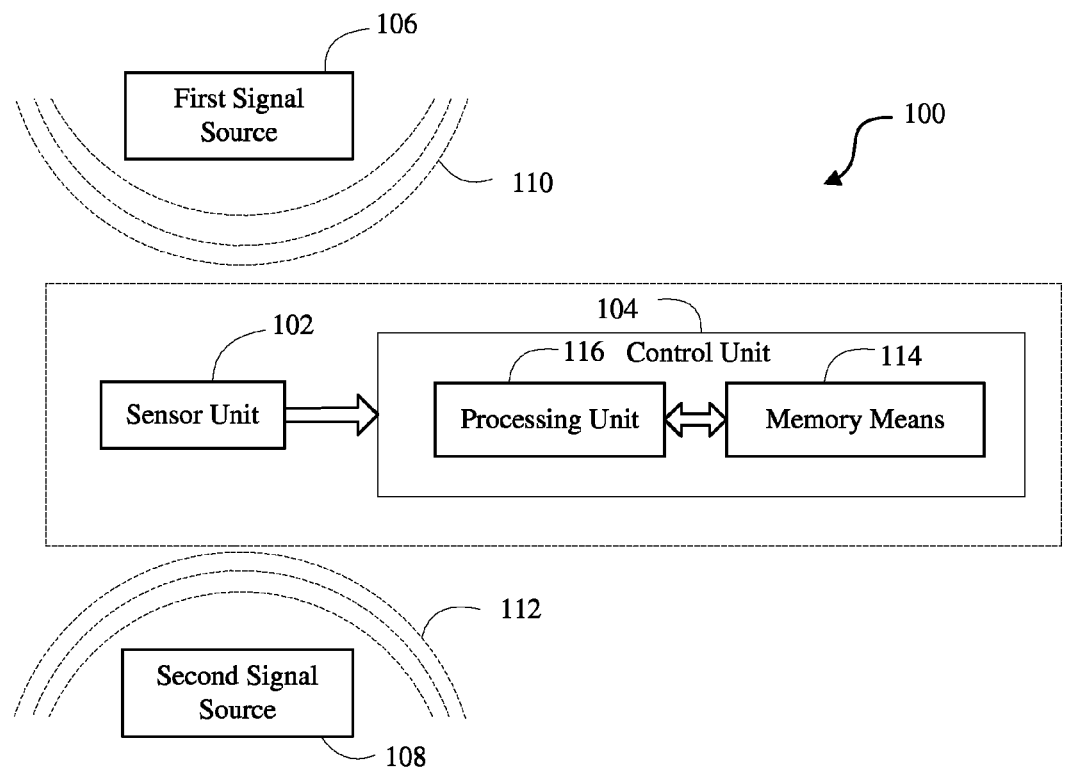
FIG. 1 illustrates a block diagram of a system for guiding a robotic garden tool to a predetermined position, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

FIG. 1 illustrates a block diagram of a system 100, according to an embodiment of the present invention. In an embodiment of the present invention, the system 100 may be embodied in a battery powered robotic garden tool for guiding the robotic garden tool to a predetermined position. In an embodiment of the present invention, the robotic garden tool may be a battery powered robotic lawnmower used in gardening applications and the system 100 may be used for guiding the robotic lawnmower to or from a charging station. However, the system 100 may also be embodied in any another equipment, for example, a battery powered automated vacuum cleaner or any other autonomous battery powered robotic tool without departing from the essence of the present invention.

In an embodiment of the present invention, the system 100 may include a sensing means such as a sensor unit 102, and a control unit 104. During the operation of the robotic garden tool, the sensor unit 102 may wirelessly detect one or more signals from a first signal source 106 and a second signal source 108. Further, the first signal source 106 is adapted to send a first signal 110 and the second signal source 108 is adapted to send a second signal 112. In an embodiment of the present invention, in case a power level of the battery of the robotic garden tool falls below a threshold power level, the sensor unit 102 may detect the first signal 110 and the second signal 112 in response to a command from the control unit 104. Alternatively, the control unit 104 may also generate a command to direct the robotic garden tool towards the predetermined position. In an embodiment of the present invention, the predetermined position is the charging station for the robotic garden tool.

Further, the sensor unit 102 may include one or more sensors, for example, but not limited to, a magnetic field sensor or a current sensor to detect corresponding magnetic field signals or electrical current signals from the first signal source 106 and/or the second signal source 108. The sensors may be positioned at a front potion of the robotic garden tool or at any suitable location on the robotic garden tool. As it may be apparent to a person ordinarily skilled in the art, the sensor unit 102 may convert the detected signals 110 and/or 112 form the first signal source 106 and the second signal source 108 to equivalent electrical signals. Further, the sensor unit 102 may provide the converted equivalent electric signals to the control unit 104.

The control unit 104 may further include a memory means 114 and a processing unit 116. In an embodiment of the present invention, the memory means 114 may be a Random Access Memory (RAM), Read Only Memory (ROM), flash memory or any suitable storage equipment. The memory means 114 may include various modules for storing operating instructions and other software of the control unit 104. The operating instructions may be a set of computer executable instructions for controlling the overall operations of the control unit 104. The memory means 114 may also store a database of parameters required to send a command to the robotic garden tool based on one or more signals received from the sensor unit 102. In an embodiment of the present invention, the parameters may also include geometry of the lawn or field, strength of the detected signals, types of detected signals etc. The one or more parameters from the memory means 114 may be communicated to the processing unit 116.

The processing unit 116 may perform all the computations required to guide the robotic garden tool to the predetermined position. The processing unit 116 may include an input/output (I/O) interface (not shown), which is operable for receiving the parameters and the computer executable instructions from the memory means 114. In an embodiment of the present invention, the processing unit 116 may also obtain the converted electrical signals from the sensor unit 102 through the I/O interface.

The processing unit 116 may also include a computing module (not shown) to generate a command for guiding the robotic garden tool to the predetermined position. In an embodiment of the present invention, a command may direct the robotic garden tool to follow the first signal 110 at a varying distance from the first signal source 106, towards a predetermined position. In various embodiments of the present invention, the varying distance of the robotic garden tool from the first signal source 106 may be less than or equal to the maximum distance from the first signal source 106, wherein, the maximum distance of the robotic garden tool from the first signal source 106 may be based on the strength of the detected first signal 110. Further, the sensor unit 102 may also detect a second signal 112 from a second signal source 108. In such a situation, a command may direct the robotic garden tool to follow the first signal 110 at a varying distance from the first signal source 106, where the varying distance may be less than or equal to the maximum distance from the first signal source 106, however, the maximum distance may be based, at least in part, on the strength of the detected second signal 112. In a further embodiment of the present invention, the computing module may determine additional parameters, such as, but not limited to, distance of the robotic garden tool from the first signal source 106 and/or the second signal source 108 for determining the maximum distance from the first signal source 110.

Further, the processing unit 116 may invoke a command from the memory means 114 based on the detected signals 110 and/or 112. The computing module included in the processing unit 116 may compare the characteristics of the detected signals 110 and/or 112 with the database stored in the memory means 114 and thus, identify the required command to be invoked from the memory means 114. In an embodiment of the present invention, the characteristics of the detected signals 110 and/or 112 may be the strength of the detected signals 110 and/or 112.

Figure 2:
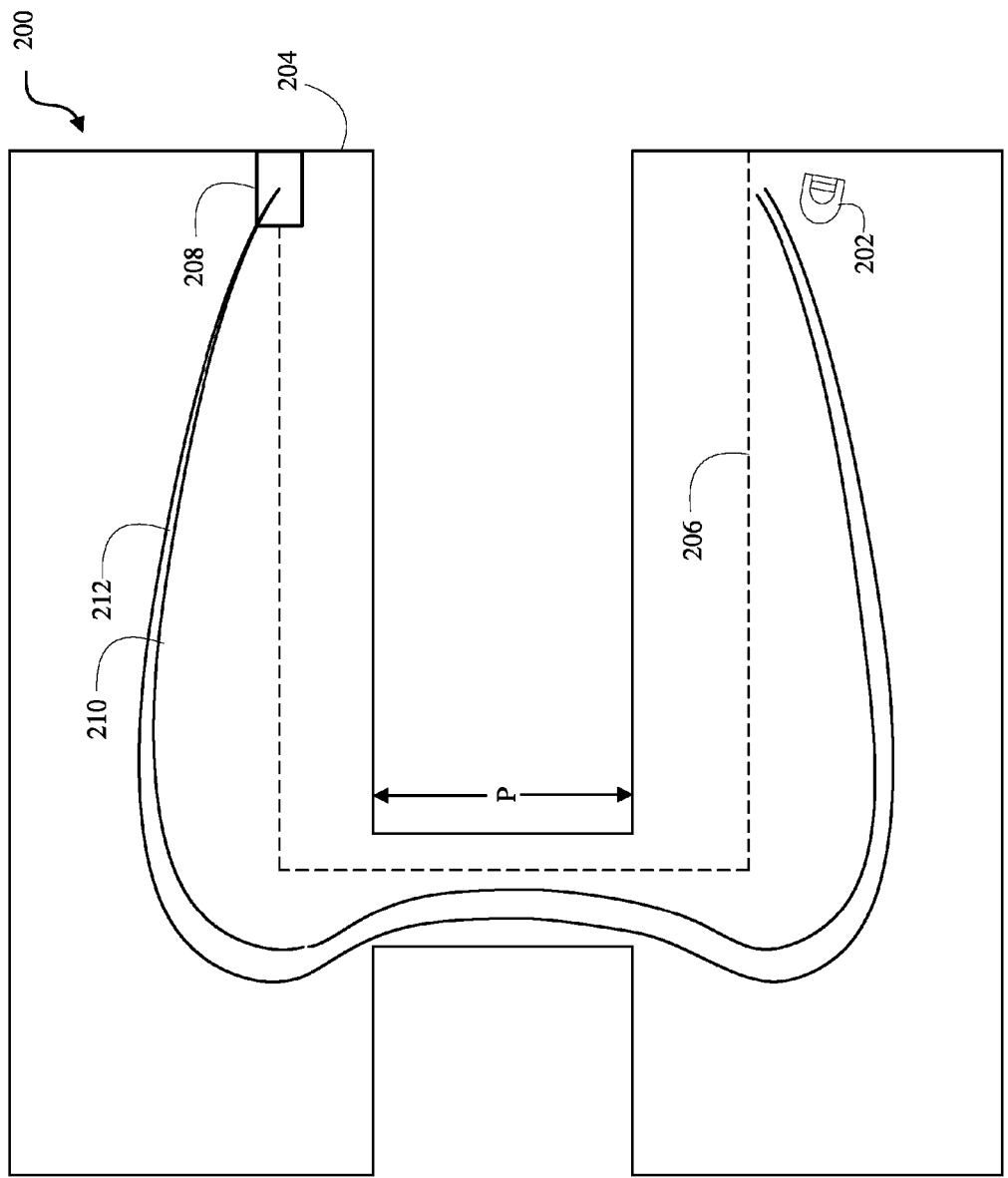
FIG. 2 illustrates a schematic diagram of a guidance system for a robotic garden tool, according to an embodiment of the present invention.

FIG. 2 illustrates a schematic diagram of a guidance system 200 for a robotic lawnmower 202, according to an embodiment of the present invention. In an embodiment of the present invention, the robotic lawnmower 202 may act as the robotic garden tool and is configured to cut vegetation within a limited area. The limited area may be any terrain with vegetation, such as lawns, gardens, yards, golf courses, fields, or the like. In an embodiment of the present invention, the limited area may be demarcated by a boundary wire 204. In an embodiment of the present invention, the boundary wire may be the second signal source 108 (explained in conjunction with FIG. 1). The boundary wire 204 may be fixed above the ground or embedded under the ground and connected to a signal generator energized by a power supply or directly connected to the power supply. In an embodiment of the present invention, the boundary wire 204 may also form loops around areas within the limited area where cutting is not desired, for example but not limiting to, fixed objects like garden sheds, trees, walls, large stones, bushes or shrubs, flower or vegetable patches, elevated fountains etc.

The guidance system 200 may further include a guide wire 206, wherein the guide wire 206 may be the first signal source 106 (explained in conjunction with FIG. 1), and adapted to send out a first signal 110. In an embodiment of the present invention, the guide wire 206 may also be fixed above the ground or embedded under the ground and connected to the boundary wire 204 and a charging station 208. The purpose of the guide wire 206 is to guide the robotic lawnmower 202 in a direct path to or from the charging station 208, a path that provides a faster transportation than if the lawnmower 202 would follow the boundary wire 204 to the charging station 208. In an embodiment of the present invention, the charging station 208 is located at the predetermined position.

In an embodiment of the present invention, the first signal 110 and the second signal 112 may be magnetic signals. Further, each of the magnetic signals may have its own unique properties. In an embodiment of the present invention, the magnetic signal properties may be defined by the current passing through each wire.

Further, the sensor unit 102 present on the robotic lawnmower 202 may have one sensor which may be adapted to detect the first signal 110 and another sensor which may be adapted to detect the second signal 112. In another embodiment of the present invention, a single sensor may be adapted for detecting a plurality of signals. In an embodiment of the present invention, the plurality of sensors may be of the same type. In an alternative embodiment the plurality of sensors may be of different types.

In an embodiment of the present invention, in case the robotic lawnmower 202 senses a need to charge the battery, the robotic lawnmower 202 may follow the first signal source 106 towards the charging station 208. In an embodiment of the present invention the robotic lawnmower 202 may follow the first signal source 106 at a varying distance, towards the charging station 208. This may ensure that the robotic lawnmower 202 may not follow a same path each time it follows the first guide wire 206 to reach the charging station 208. Hence, over a large number of working cycles of the robotic lawnmower 202, any permanent marks and/or tracks on lawns due to wheels may be avoided. In an embodiment of the present invention, the distance at which the robotic lawnmower 202 may follow the first signal source 106 may be less than or equal to the maximum distance from the first signal source 106.

In an embodiment of the present invention, while the robotic lawnmower 202 may be following the first signal 110, it may also detect the second signal 112. In an embodiment of the present invention, on detection of the second signal 112, the control unit 104, may send command signals to the robotic lawnmower 202, for varying the maximum distance of the robotic lawnmower 202 from the first signal source 106. In an embodiment of the present invention, the new maximum distance may be based upon the strength of the detected second signal 112. Further, in an embodiment of the present invention, the new maximum distance may be shorter for a larger strength of the detected second signal 112; this may be the case wherein both the signal sources are closer to each other. This may lead to the robotic lawnmower 202 following the first signal source 106 closely when both the signals are in close proximity. This may further ensure that, the robotic lawnmower 202 may automatically adjust and follow the first signal source 106 closely in narrow areas, e.g. pathway (P), where both the signal sources may be in close proximity. This may solve both the problems of permanent tracks on grass and closely following the guide wire 206 in narrow areas, without the further need for expensive apparatus. The maximum distance will hence be larger in wider areas of the garden, and smaller in narrower areas of the garden.

The robotic lawnmower 202 may follow the signals 110/112 on a plurality of different paths. In an exemplary embodiment, FIG. 2 depicts the various paths, labeled as 210 and 212. In an embodiment of the present invention, the paths may be randomly selected when starting to follow the guide wire. In an embodiment of the present invention, the strength of the first signal 110 and/or second signal 112 may be varied by changing the current in the respective signal sources.

Still further, in another embodiment of the present invention, the guide wire 206 may have different shapes for covering mowing areas with different geometries. In a further embodiment of the present invention, the system 200 may have plurality of guide wire 206, for covering larger mowing areas.

Figure 3:
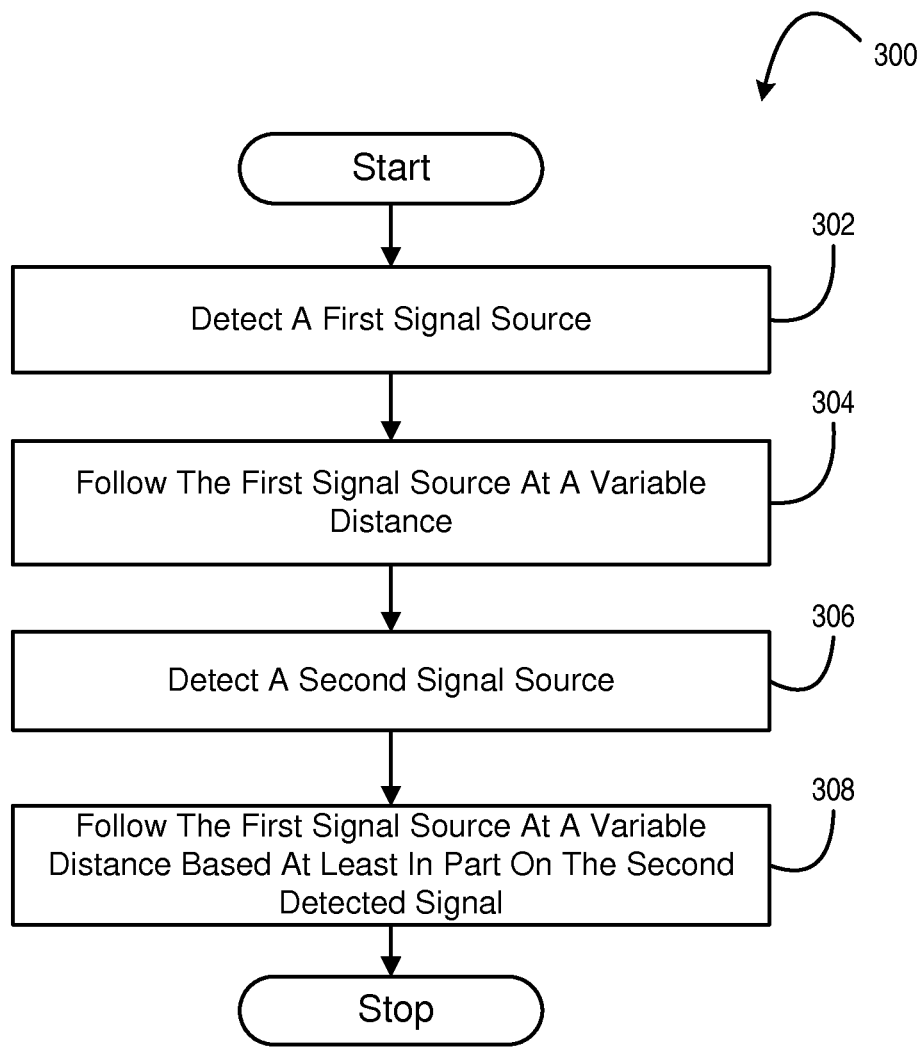
FIG. 3 illustrates a flow chart of an exemplary method for guiding a robotic garden tool to a predetermined position, according to an embodiment of the present invention.

FIG. 3 illustrates a flow chart of a method 300 for guiding a robotic garden tool to a predetermined position, according to an embodiment of the present invention. In step 302 of the method 300, the robotic garden tool may detect the first signal 110, from the first signal source 106. In an embodiment, the first signal source 110 may be a guide wire 206. As described above, the sensor unit 102 mounted on the robotic garden tool may detect the first signal 110. The first signal 110 may be a magnetic signal. Further, the first signal 110 may have a particular strength associated with it.

Following the step 302, at step 304 the robotic gardening tool may follow the first signal 110 at the varying distance from the first signal source 106. As described above, the control unit 104 may generate a command in response to the detected first signal 110 to guide the robotic garden tool towards the predetermined position. The command may direct the driving mechanism to vary the distance from the first signal source 106. The varying distance may be less than or equal to the maximum distance from the first signal source 106. The varying distance may be randomly selected upon start of the following in step 302.

Further, in step 306 of the method 300, the robotic garden tool may detect the second signal 112. In an embodiment of the present invention, the second signal 112 may have a particular strength associated with it, which may distinguish it from the first signal 110. In an embodiment of the present invention, the second signal 112 is received from the second signal source 108. In an embodiment of the present invention, the second signal source 108 may be the boundary wire 204.

In step 308, in an embodiment of the present invention, the robotic garden tool may follow the first signal 110 at a varying distance from the first signal source 106. In an embodiment of the present invention, the varying distance from the first signal source 106 may be less than or equal to the maximum distance from the first signal source 106. Further, the maximum distance may be set based at least in parts on the detected strength of the second signal 112. Wherein, greater the strength of the detected second signal 112, less is the maximum distance from the first signal source 106.

Though the above mentioned invention explains the working with respect to robotic garden tool, a person skilled in the art may know that such a system may be easily implemented on other tools like, but not limited to, automated vacuum cleaners.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for guiding a robotic garden tool to a predetermined position, the robotic garden tool is provided with at least one sensing means adapted to detect a signal in a wire, the method comprising the steps wherein the robotic garden tool;
   detects a first signal from a first signal source,
   follows the first signal source at a varying distance to the first signal source, wherein the varying distance is a distance less than or equal to a first maximum distance to the first signal source,
   detects a second signal from a second signal source, and
   responsive to detection of the second signal, follows the first signal source at a varying distance from the first signal source that is less than or equal to a second maximum distance from the first signal source,
   wherein the second maximum distance to the first signal source is set based on detected strength of both the first signal source and the second signal source.

2. A method according to claim 1, wherein the at least one sensing means comprises a first and a second sensing means, and wherein the first sensing means is adapted to detect the first signal from the first signal source, and the second sensing means is adapted to detect the second signal from the second signal source.

3. A method according to claim 1, wherein the first signal source is a guide wire.

4. A method according to claim 1, wherein second signal source is a boundary wire.

5. A method according to claim 1, wherein the robotic garden tool follows the first signal source at a varying distance from the first signal source based at least in part on a detected strength of the first signal from the first signal source.

6. A method according to claim 1, wherein the robotic garden tool is configured to reduce the second maximum distance on detection of a larger strength of the second signal from the second signal source.

7. A method according to claim 1, wherein the first signal and the second signal are magnetic field signals.

8. A method according to claim 1, further comprising determining the distance of the robotic garden tool from both the first signal source and the second signal source.

9. A method according to claim 8, further comprising determining the maximum distance based on the determined distances from both the first signal source and the second signal source.

10. A robotic garden tool guiding system comprising,
a first signal source providing a first signal,
a second signal source providing a second signal,
a robotic garden tool comprising at least one sensing means adapted to detect the first signal and the second signal,
wherein the robotic garden tool is adapted to detect the first signal and follow the first signal source towards a predetermined position, at a varying distance to the first signal source wherein the varying distance is less than or equal to a first maximum distance to the first signal source, and
responsive to detection of the second signal, follows the first signal source at a varying distance from the first signal source that is less than or equal to a second maximum distance from the first signal source,
wherein the second maximum distance to the first signal source is set based on detected strength of both the first signal source and the second signal source.

11. A system according to claim 10, wherein the at least one sensing means, comprises a first and a second sensing means, and wherein the first sensing means is adapted to detect the first signal and the second sensing means is adapted to detect the second signal.

12. A system according to claim 10, wherein first signal source is a guiding wire.

13. A system according to claim 10, wherein second signal source is a boundary wire.

14. A system according to claim 10, wherein the robotic garden tool is adapted to follow the first signal source at a varying distance to the first signal source based at least in part on a detected strength of the first signal from the first signal source.

15. A method according to claim 1, wherein the robotic garden tool is configured to reduce the second maximum distance on detection of a larger strength of the second signal from the second signal source.

16. A system according to claim 10, wherein first signal and the second signal are magnetic field signals.

17. A system according to claim 10, wherein the predetermined position is the position of a charging station.

18. A system according to claim 10, wherein the robotic garden tool is a robotic lawn mower.

* * * * *